US008954393B1

(12) United States Patent
Botes (10) Patent No.: US 8,954,393 B1
(45) Date of Patent: Feb. 10, 2015

(54) OPPORTUNISTIC PERFORMANCE ALLOCATIONS IN DATA STORAGE SYSTEMS

(75) Inventor: Par Botes, Mountain View, CA (US)

(73) Assignee: Symantec Operating Corporation, Mountain View, CA (US)

(*) Notice: Subject to any disclaimer, the term of this patent is extended or adjusted under 35 U.S.C. 154(b) by 1335 days.

(21) Appl. No.: 10/997,724

(22) Filed: Nov. 24, 2004

(51) Int. Cl.
*G06F 17/30* (2006.01)

(52) U.S. Cl.
USPC .......................... 707/651; 707/635; 707/652

(58) Field of Classification Search
USPC ..................................... 707/1–10, 100–104.1
See application file for complete search history.

(56) References Cited

U.S. PATENT DOCUMENTS

| | | | |
|---|---|---|---|
| 6,269,382 B1 | 7/2001 | Cabrera et al. | |
| 6,330,572 B1 | 12/2001 | Sitka | |
| 6,505,241 B2 | 1/2003 | Pitts | |
| 6,760,808 B2 * | 7/2004 | Peters et al. | 711/114 |
| 7,007,048 B1 | 2/2006 | Murray et al. | |
| 7,076,690 B1 * | 7/2006 | Todd et al. | 714/13 |
| 7,089,281 B1 * | 8/2006 | Kazemi et al. | 709/203 |
| 7,225,308 B2 * | 5/2007 | Melament et al. | 711/162 |
| 2004/0073582 A1 * | 4/2004 | Spiegel | 707/204 |
| 2004/0199566 A1 * | 10/2004 | Carlson et al. | 709/201 |

OTHER PUBLICATIONS

Castro et al., "HAC: Hybrid Adaptive Caching for Distributed Storage Systems," Proceedings of the ACM Symposiuym on Operating System Principles (SOSP '97), Oct. 1997, (18 pages).
Kossmann et al., "Cache Investment: Integrating Query Optimization and Distributed Data Placement,"ACM Transactions on Database Systems, vol. 25, No. 4, Dec. 2000, (pp. 517-558).
U.S. Appl. No. 10/999,883, filed Nov. 30, 2004.

* cited by examiner

*Primary Examiner* — Sangwoo Ahn
(74) *Attorney, Agent, or Firm* — Robert C. Kowert; Meyertons, Hood, Kivlin, Kowert & Goetzel, P.C.

(57) ABSTRACT

System and method for the opportunistic allocation of copies of data across data storage resources in file systems. Embodiments may opportunistically and transparently trade storage space in a file system for performance. In embodiments, when data is stored to the file system, copies of the data may be opportunistically stored to two or more data storage resources. The data may then be opportunistically accessed from a less active resource if the resource storing a primary copy of the data is busy. The opportunistically stored copies of data remain online in the file system. In hierarchical file systems or tiered storage hierarchies, embodiments may allow higher-level storage tiers to "borrow" performance from lower-level tiers by opportunistically allocating copies of data from a higher-level tier within a lower-level tier. Copies of data stored on a data storage resource may be deleted if storage space is needed on that data storage resource.

19 Claims, 5 Drawing Sheets

OPPORTUNISTIC PERFORMANCE ALLOCATIONS IN DATA STORAGE SYSTEMS

BACKGROUND OF THE INVENTION

1. Field of the Invention

This invention is related to the field of computer systems and, more particularly, to data storage systems.

2. Description of the Related Art

A file system may be defined as a collection of files and file system metadata (e.g., directories and inodes) that, when set into a logical hierarchy, make up an organized, structured set of information. File systems organize and manage information stored in a computer system. File systems may support the organization of user data by providing and tracking organizational structures such as files, folders, and directories. A file system may interpret and access information stored in a variety of storage media, abstracting complexities associated with the tasks of locating, retrieving, and writing data to the storage media. File systems may be mounted from a local system or remote system. File system software may include the system or application-level software that may be used to create, manage, and access file systems.

File system metadata may be defined as information that file system software maintains on files stored in the file system. File system metadata may include, but is not limited to, definitions and descriptions of the data it references. File system metadata may include one or more of, but is not limited to, inodes, directories, mapping information in the form of indirect blocks, superblocks, etc. Generally, file system metadata for a file includes path information for the file as seen from the application side and corresponding file system location information (e.g. device:block number(s)). File system metadata may itself be stored on a logical or physical device within a file system.

Hierarchical Storage Management (HSM)

Hierarchical Storage Management (HSM) is a data storage solution that provides access to vast amounts of storage space while reducing the administrative and storage costs associated with data storage. HSM systems may move files along a hierarchy of storage devices that may be ranked in terms of cost per megabyte of storage, speed of storage and retrieval, and overall capacity limits. Files are migrated along the hierarchy to less expensive forms of storage based on rules that may be tied to the frequency of data access.

In HSM file systems, data access response time and storage costs typically determine the appropriate combination of storage devices used. A typical three-tier HSM architecture may include hard drives as primary storage, rewritable optical as secondary storage, and tape as tertiary storage. Alternatively, hard drives may be used for secondary storage, and WORM (Write Once, Read Many) optical may be used as tertiary storage.

Rather than making copies of files as in a backup system, HSM migrates files to other forms of storage, freeing hard disk space. Events such as crossing a storage threshold and/or reaching a certain file "age" may activate the migration process. As files are migrated off primary storage, HSM leaves stubs to the files on the hard drive(s). These stubs point to the location of the file on the alternative storage, and are used in automatic file retrieval and user access. The stub remains within the file system of the primary storage, but the file itself is migrated "offline" out of the file system onto the alternative or tertiary storage (e.g. tape).

SUMMARY

Embodiments of a system and method for the opportunistic allocation of copies of data across data storage resources in file systems are described. In embodiments, when data is stored to the file system, a data allocation mechanism of the file system software may opportunistically store copies of the data to two or more data storage resources. The file system software may then opportunistically access the data from a less active data storage resource if the data storage resource storing a primary copy of the data is busy. By opportunistically allocating multiple copies of files and/or file to segments across data storage resources in a file system, and then opportunistically accessing copies of data from less active data storage resources, embodiments may increase performance of the file system through the distribution of I/O and/or bandwidth across the data storage resources. Note that the opportunistically stored copies of data remain online in the file system; the copies are not stored to offline storage.

In hierarchical file systems or tiered storage hierarchies, embodiments of the data allocation mechanism may allow higher-level storage tiers to "borrow" available performance from lower-level storage tiers by opportunistically allocating one or more copies of files and/or file segments stored in a higher-level tier within one or more of the lower-level tiers if storage space is available in the lower tiers. If a data storage resource in a lower tier includes a copy of data also stored on a higher tier, accesses to the data may be opportunistically redirected by the file system software to the copy of the data on the lower tier if the higher tier is busy.

Additional and/or modified metadata and policy layers may be included in the file system. In one embodiment, user-defined policies may, for example, specify which tiers and/or data storage resources are to be used and/or which are not to be used for the opportunistic performance allocation of copies of data. In one embodiment, the policies may also specify particular data (e.g. particular files, or data belonging to particular entities within a corporation) that can be opportunistically copied to two or more data storage resources and other data, if any, that is not to be opportunistically copied by the data allocation mechanism.

The file system metadata may include indications that the data is copied to multiple data storage resources. In one embodiment, instead of a device and offset, metadata for data that has been copied to multiple data storage resources may include a list of devices and offsets. The file system software accesses the metadata to handle the direction of access requests from processes that want to access the data to particular copies of the data on less busy data storage resources. Embodiments may include a mechanism for the file system software to monitor activity levels of the data storage resources so that the file system software may determine a less busy data storage resource to satisfy a particular data access requests if a data storage resource storing a primary copy of the data is busy.

The file system software may track accesses of the copies of the data to maintain consistency among the copies. In one embodiment, if one copy of data is updated, other copies of that data may be invalidated so that the copies can later be synchronized. If the file system software determines that storage space on a particular data storage resource is needed for some other purpose, then the file system software may delete or overwrite at least some of the copies of data that have been stored to that data storage resource by the data allocation mechanism.

Embodiments may be virtualized, and thus opportunistic data allocation and access may be invisible to applications, processes and users that access the file system. While this document primarily describes embodiments implemented in file systems implemented as tiered storage hierarchies, note that embodiments may be implemented in other file system architectures. In addition, embodiments may be implemented in other data systems than file systems and/or at other levels of a file system, for example at the volume manager level.

BRIEF DESCRIPTION OF THE DRAWINGS

The following detailed description makes reference to the accompanying drawings, which are now briefly described.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Embodiments of a system and method for the opportunistic allocation of copies of data across data storage resources in file systems are described. In embodiments of an opportunistic data allocation and access mechanism, when data is stored to the file system, a data allocation mechanism may opportunistically store copies of the data to two or more data storage resources in the file system. The file system software may then opportunistically access the data from a less active or the least active data storage resource. As used herein, data storage resources may include, but are not limited to, physical storage devices (e.g., disk drives) and logical storage devices (e.g., virtual disk drives or volumes), which may, for example, be organized in tiers, volumes or classes in tiered storage hierarchies. In addition, tiers, volumes and classes may be considered data storage resources themselves.

A file system may be implemented as a tiered (or multi-class) storage hierarchy. Tiered storage hierarchies may address the cost of owning data by segmenting data storage into multiple classes or tiers of storage. In tiered storage hierarchies, two or more tiers of storage are implemented, data may be stored to one or more of the tiers, and stored data may be moved or migrated between the tiers of storage. Storage and migration of data may be controlled by a set of rules or policies. The movement of data among the tiers may be controlled according to the policies based on various characteristics of the data including one or more of, but not limited to, the type of data, age of the data, ownership of the data, usage pattern, etc. Note that each storage tier in a tiered storage hierarchy may include one or more physical storage devices or, alternatively, may be implemented as volumes or virtual devices allocated across one or more physical storage devices.

The storage devices in the tiers (or classes) of the file system may be distributed among the classes according to one or more characteristics of the storage devices. For example, higher tiers or classes of storage may include higher-performing and/or more expensive storage devices, while lower tiers or classes may include lower-performing and/or less expensive storage devices.

Hierarchical Storage Management (HSM) is an example of a data storage solution for implementing limited tiered storage hierarchies. Multi-volume, or multi-class, file systems may be used to implement tiered storage hierarchies. A multi-volume file systems may deliver quality of storage service by using a multi-dimensional storage hierarchy to optimize the performance, availability, and cost of storing digital data. In a multi-volume file system, a volume set effectively forms a pool of storage from which the file system allocates user data and its own metadata.

Figure 1:
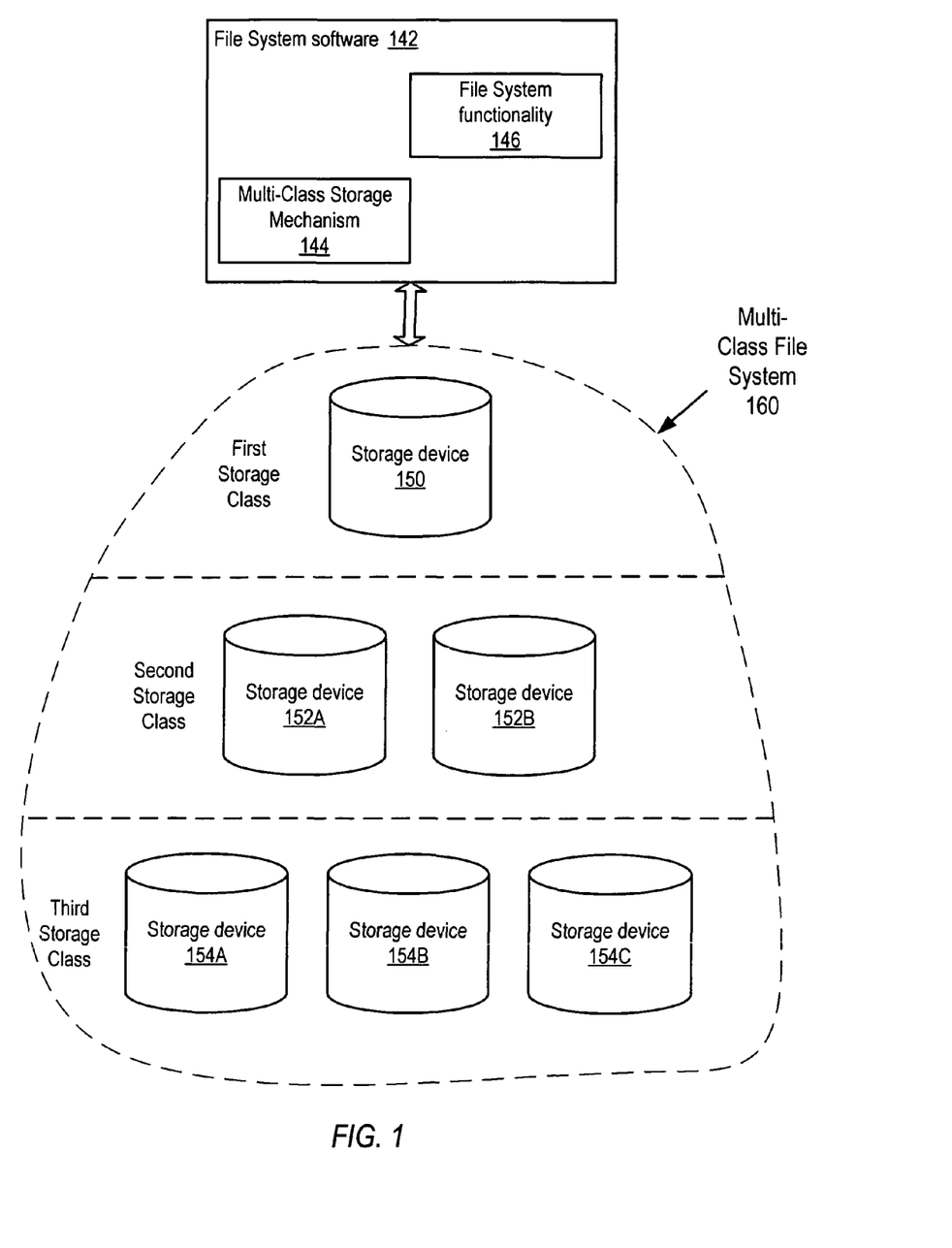
FIG. 1 illustrates an exemplary multi-class file system based on a multi-device feature of File System software according to one embodiment.

FIG. 1 illustrates an exemplary multi-class file system based on a multi-device feature of File System software according to one embodiment. File system software 142 may include, but is not limited to, an embodiment of a multi-class storage mechanism 144 and software that provides "traditional" File System functionality 146. File System functionality 146 may be provided by any of various File System implementations including, but not limited to, disk-based file systems such as VERITAS' VxFS and UNIX File System (UFS), and networked file system such as Network File System (NFS) and AT&T's Remote File Share (RFS).

Each storage device in the multi-class file system 160 may be a logical or physical storage device. Typically, a physical device will be assigned to a particular class, but it is possible that two or more logical devices on one physical device may be allocated to different storage classes. The storage devices may be segmented into N storage classes in the multi-class file system 160 (in this example, three storage classes) by File System functionality 146. In this example, the first storage class includes storage device 150, the second storage class includes storage devices 152A and 152B, and the third storage class includes storage devices 154A, 154B, and 154C. Note that a storage class may include any number of individual storage devices.

The storage devices may be divided into storage classes by File System functionality 146 according to one or more characteristics of the storage devices. In one embodiment, the storage classes may be arranged from a first storage class of highest-performing (and typically most expensive) storage devices, to a lowest storage class of lowest-performing (and typically least expensive) storage devices. There may be more storage devices per storage class in lower storage classes than in higher storage classes, but this is not required. The storage devices may be heterogeneous; that is, there may be different vendors and/or models of storage devices in the different storage classes, and there may be different vendors or models of storage devices within a storage class. In other words, storage devices may be grouped in a storage class and/or divided into different storage classes according to performance characteristics rather than make and model.

In one embodiment of the multi-device implementation, the file system software 142 may address each device as a range of blocks (e.g. from 0-n). In one embodiment, the multi-class file system may address a particular block in the file system as a device:block number, or alternatively device: extent, if extents are used. The device:block number may be associated with a path or directory in the file system metadata. The multi-class storage mechanism 144 tracks which storage devices are assigned to which storage classes. If the multi-class file system 144 moves a file or portion of a file to another storage device on another storage class, the file or portion of a file remains active in the file system, and the metadata is modified to reflect the move. The device:block number is changed, but the path or directory information remains the same. Thus, the move is transparent to an application that accesses the file.

By opportunistically allocating multiple copies of files and/or file segments across data storage resources in a file system, for example across data storage resources (either classes or devices within classes) in the exemplary multi-class file system described in FIG. 1, and then opportunistically accessing copies of data from less active data storage resources, embodiments of the opportunistic data allocation and access mechanism may improve performance of the file system through the distribution of I/O and/or bandwidth across the data storage resources.

Embodiments may opportunistically trade storage space in a file system for performance. In a storage system with multiple data storage resources, embodiments may opportunistically store copies of data on more than one data storage resource, for example in more than one class of the exemplary multi-class file system illustrated in FIG. 1. Data (e.g. a file or portion of a file) stored on one data storage resource may be replicated by the data allocation mechanism to one or more other data storage resources within the to file system. If there is contention for data stored on any one data storage resource, there may be a copy of at least some of that data on at least one other data storage resource in the file system. If one of the data storage resources that includes a copy of the data to be accessed is not in contention or is less busy than the others, the copy of the data may be accessed from that data storage resource by the file system software. Thus, the file system software may opportunistically access the data from a data storage resource that is less busy. Note that, if storage space is needed on any of the data storage resources for other file system purposes, then copies of data on that data storage resource opportunistically stored by the data allocation mechanism may be deleted or overwritten by the file system software. Note that the opportunistically stored copies of data remain online in the file system; the copies are not stored to offline storage.

In hierarchical file systems or tiered storage hierarchies, embodiments of the data allocation mechanism may allow higher-level storage tiers (or, classes) to "borrow" available performance from lower-level storage tiers by opportunistically allocating one or more copies of files and/or file segments stored in a higher-level tier within one or more of the lower-level tiers if storage space is available in the lower tiers. If a data storage resource in a lower tier includes a copy of data also stored on a higher tier, accesses to the data may be opportunistically redirected by the file system software to the copy of the data on the lower tier if the higher tier is busy.

By redirecting non-conflicting I/Os (reads) to copies of the data on the lower tiers, the file system software may realize improved performance based on a combination of policy (priority) and observed behavior. The performance gain may come at the cost of additional allocations, but since those allocations may be fulfilled out of free space that may later be released when storage space on the lower tiers is needed for other purposes, customers may realize performance advantages essentially "for free."

Additional and/or modified metadata and policy layers may be included in the file system to address issues such as coherence across copies of data in the file system. In one embodiment, user-defined policies may, for example, specify which tiers and/or data storage resources are available to be used for the opportunistic performance allocation of copies of data. For example, if there are ten data storage resources, eight may be available for opportunistic performance allocation of data and two may not be for some reason. The other two data storage resources may, for example, be intended for periodic replication/backup to offline storage, and it may not be desirable to put extra data on those data storage resources that may be unnecessarily replicated to offline storage. In one embodiment, the policies may also specify particular data (e.g. particular files) that can be opportunistically copied to two or more data storage resources and other data, if any, that should not be opportunistically copied but only stored on one data storage resource.

The file system metadata for the data may include indications that the data is copied to multiple data storage resources. In one embodiment, instead of a device and offset, metadata for data that has been copied to multiple data storage resources may include a list of devices and offsets. The file system software accesses the metadata to opportunistically redirect access requests from processes that want to access the data to particular copies of the data on less busy data storage resources. Embodiments may include a mechanism for the file system software to monitor or determine activity levels of the data storage resources so that the file system software may select data storage resources including copies of data to satisfy particular data access requests.

The file system software may track accesses of the copies of the data to maintain consistency among the copies. In one embodiment, if one copy of data, e.g. a file or portion of a file, is updated, other copies of that data may be invalidated so that the copies can later be synchronized. If the file system software determines that storage space on a particular data storage resource is needed for some other purpose, for example to move some data from one storage tier to another in a tiered storage hierarchy according to a policy, then the file system software may delete or overwrite at least some of the copies of data that have been opportunistically stored to that data storage resource by the data allocation mechanism. Metadata for the data may be updated to reflect that the copies of data have been deleted or overwritten.

The opportunistic performance allocation and access of copies of data in a file system may be virtualized and thus invisible to applications that access the file system. An application or process that access the file system does not need to be aware that there may be multiple copies of data on different data storage resources that may be opportunistically accessed by the file system software to satisfy accesses of that data from the application. From the application, process, or user perspective, there is only one copy of the data.

Embodiments of the opportunistic data allocation and access mechanism may be implemented in file systems configured as tiered storage hierarchies, such as multi-volume or multi-class file systems. This document primarily describes embodiments implemented in exemplary tiered storage hierarchies, but note that embodiments may be implemented in other file system architectures. In addition, embodiments of an opportunistic data allocation and access mechanism may be implemented in other data systems than file systems and/or at other levels of a file system, for example at the volume manager level.

Opportunistic data allocation may be implemented at one or more levels in a data storage hierarchy, from the highest level (the file level) to levels below that, such as the disk block level. One embodiment may be implemented in a volume manager in which I/Os are distributed to multiple locations (disk blocks) to which copies of data are stored by an opportunistic data allocation mechanism for the volume manager. One embodiment may be implemented in a disk array; in this embodiment, a disk array may put one copy of data on disk and another in cache memory. The data allocation mechanism may place copies of data on multiple disks within the disk array, for example to four different locations (disks) within the disk array. If one disk is busy, a copy of the data may be accessed from another disk in the disk array that is not busy.

FIGS. 2A through 4 illustrate means for storing copies of data to each of two or more of a plurality of data storage resources in a file system implemented on the plurality of data storage resources, and means for redirecting access requests for the data to a less active one of the two or more data storage resources storing copies of the data.

Figure 2A:
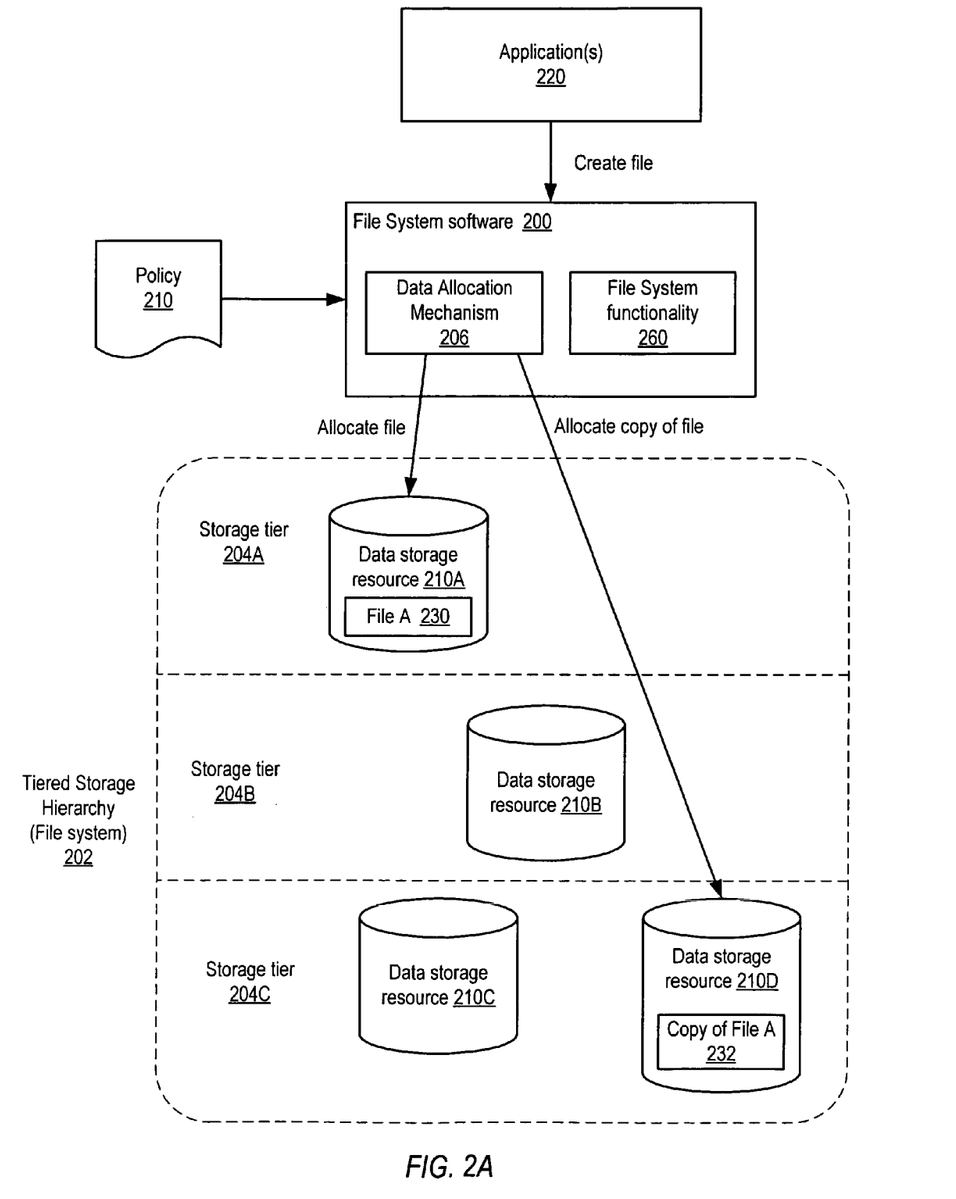
FIGS. 2A and 2B illustrate an exemplary file system with file system software implementing a tiered storage hierarchy and including an opportunistic data allocation mechanism according to one embodiment.
Figure 2B:
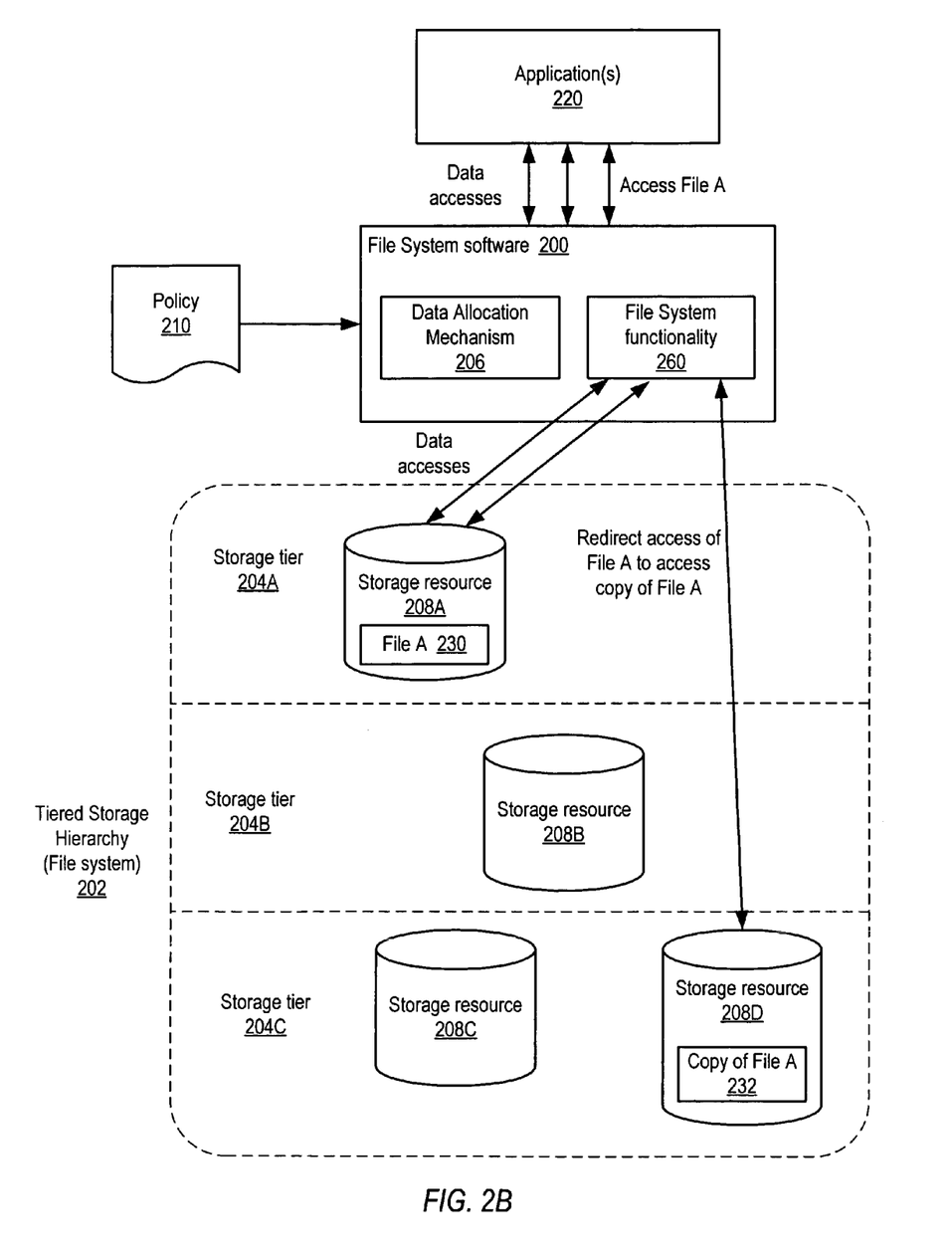

FIGS. 2A and 2B illustrate an exemplary file system with file system software implementing a tiered storage hierarchy and including an opportunistic data allocation mechanism according to one embodiment. Tiered storage hierarchy 202 is a file system, which may be implemented, for example, as a multi-volume or multi-class file system. File system software 200 may include the system or application-level software that may be used to create, manage, and access the file system. Note that each storage tier 204 may include one or more data storage resources 208 which may be physical storage devices or, alternatively, may be implemented as volumes or virtual devices allocated across one or more physical storage devices.

File system software 200 may include a data allocation mechanism 206 for allocating data in the file system 202 and opportunistically storing copies of the data to different ones of the data storage resources 208 according to a user-defined policy 210. Policy 210 may be accessed by file system software 200, and may include user-defined specifications for storing and moving data on the storage tiers 204. Policy 210 may also include user-defined specifications defining which data storage resources 208 may be used for opportunistic data allocation and which, if any, may not. Policy 210 may also include user-defined specifications of which data may or may not be opportunistically copied to multiple data storage resources 208. These specifications may, for example, exclude or allow certain types of data or file types and/or data created by or belonging to certain applications, particular users, or particular departments to be opportunistically copied to multiple data storage resources 208.

If new data is created by an application 220 is to be stored to the file system 202, data allocation mechanism 206 may, according to policy 210, opportunistically store copies of the new data to two or more of the data storage resources 208, if free space is available on the data storage resources 208.

In one embodiment, in addition to opportunistically creating copies of new data on multiple data storage resources 208, data allocation mechanism 206 may opportunistically create copies of existing data in file system 202 on one or more of the data storage resources 208. In this embodiment, data allocation mechanism 206 may periodically or aperiodically examine data storage resources 208 and the data stored on the resources and, if data (e.g., files or parts of files) are detected on a data storage resource 208 that might benefit from being copied to one or more other data storage resources 208 and if space is available on the other data storage resources 208, may copy the data to the one or more other data storage resources 208.

In FIG. 2A, an application 220 may create a file. Data allocation mechanism 206 may, according to policy 210, allocate one (a "primary") copy of the file (File A 230) to a first data storage resource 210A in a first storage tier 204A. If the policy 210 indicates that this file can be opportunistically copied to more than one data storage resource 208, and if another data storage resource (data storage resource 208D, in this example) is available to store a copy of the file, then copy of File A 232 may be stored to data storage resource 208D. Data allocation mechanism 206 may opportunistically store copies of the file to one or more of the other data storage resources 208 in the file system, which may be in other or in the same storage tier 204. In one embodiment, data allocation mechanism 206 may replicate the entire or parts of File A 232 to other data storage resources 208, and may replicate different parts of the File A 232 to different data storage resources 208. Note that copies of data opportunistically stored to the data storage resources 208 by data allocation mechanism 206 remain online and available in the file system, and are not stored "offline".

In one embodiment, metadata for the data (e.g., for File A 232) are modified by the file system software 200 to indicate that multiple copies of the data are stored to different data storage resources 208. In one embodiment, the metadata for data, e.g. File A 232, may include device/offset indications that point to the primary and each copy of the data.

In FIG. 2B, one or more applications 220 may access the file system 202. Note that, while only one file is shown on data storage resource 208A and one on data storage resource 208D, the data storage resources may, of course, contain any number of files or portions of files that may be accessed by application(s) 220. Thus, at any one time, the file system and individual data storage resources 208 within the file system may be heavily or lightly accessed by application(s) 220. If one of the application(s) 220 attempts to access File A 232, file system functionality 260 of file system software 200 may, if data storage resource 208A is being accessed, for example above a predetermined activity threshold, opportunistically redirect the access of File A 232 to copy of File A 234 stored on data storage resource 208D, if data storage resource 208D is not as busy as data storage resource 208A.

In one embodiment, file system functionality 260 may access the metadata for File A 232 to determine the location(s) of available alternate copies of the file stored to other data storage resources 208. If there is more than one copy available, then file system functionality 260 may include a mechanism for determining a least busy data storage resource 208 to which the access of the file may be redirected. Note that file system functionality 260 does not necessarily redirect each data access; if the data storage resource including a primary copy of data (e.g., a file or portion of a file) is not busy, or if the data storage resource or resources 208 that include a secondary copy of the data are themselves busy or are not available for some other reason, a data access may not be redirected.

Thus, embodiments may opportunistically use available storage space on data storage resources 208 to opportunistically take advantage of the potentially underutilized, available performance of those resources. The data allocation mechanism 206 is opportunistic; if storage space is low on a particular data storage resource 208, then data may not be copied to that resource. The data allocation mechanism 206 may be controlled by one or more user-defined policies 210 that may be used to specify which data storage resources 210 are available for the opportunistic allocation of copies of data and which, if any are not. In one embodiment, the policies 210 may also be used to specify particular data (e.g. particular files) that can be opportunistically copied to two or more data storage resources 208 and other data, if any, that is not to be copied but only stored on one data storage resource 208.

In a tiered storage hierarchy such as file system 202, higher tiers such as storage tier 204A may include data storage resources 208 that provide higher performance than data storage resources 208 in lower tiers such as storage tier 204C. In normal operations, a higher tier (with higher performance) may be busy, and a lower tier may be less busy, when "primary" data stored on the higher tier is accessed. By opportunistically using available free space on a data storage resource in a lower tier to store copies of the primary data, performance of the lower tier may be opportunistically used by the file system software 200. File system software 200 may opportunistically redirect the data access to copies of the primary data opportunistically stored on a lower tier by the data allocation mechanism 206. If there is an opportunity for the file system software 200 to take performance (bandwidth performance and/or I/O performance) from a lower tier, then the file system software 200 may redirect accesses of the primary data on the higher tier to copies of the data opportunistically stored on a lower tier. If the storage space on a lower tier opportunistically used by the data allocation mechanism 206 to store copies of primary data on a higher tier is later needed, the file system software 200 may overwrite the copies of the data stored to the lower tier knowing that there is an original or primary copy of the data elsewhere.

Figure 3:
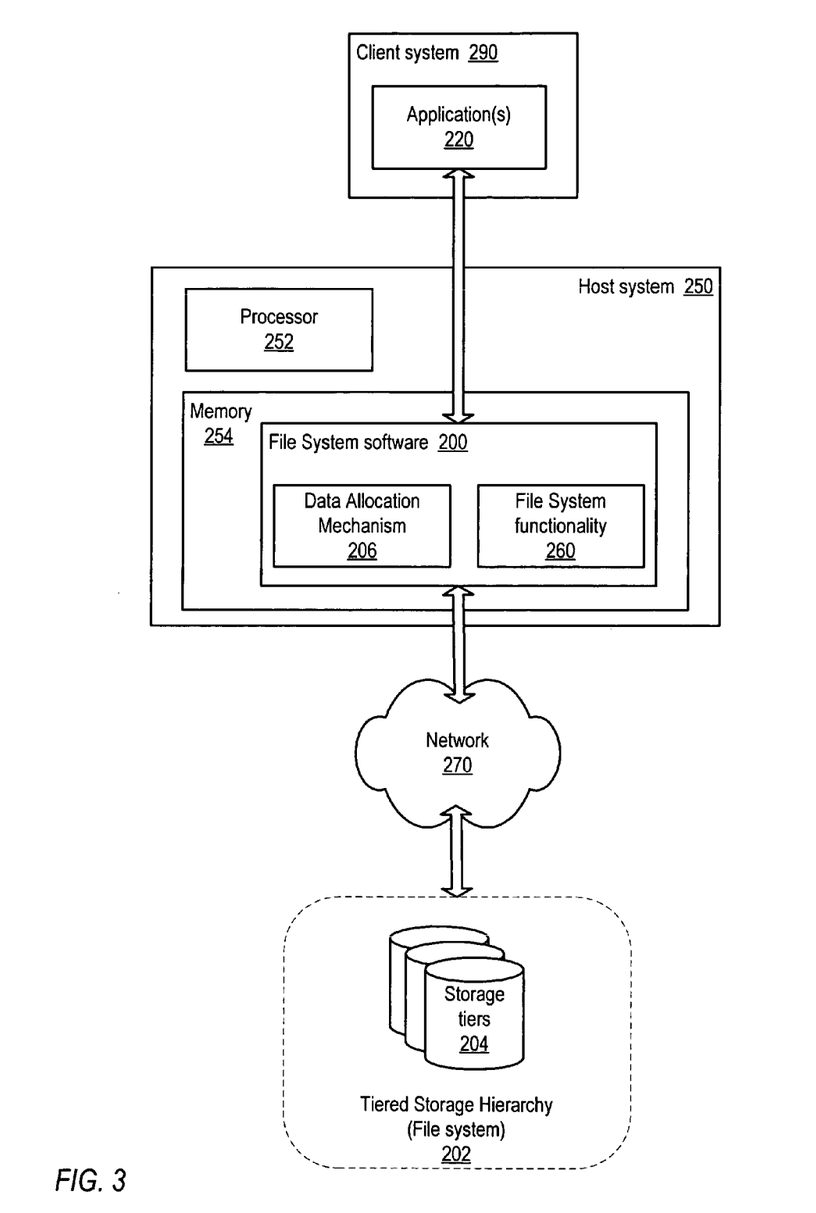
FIG. 3 illustrates an exemplary file system implementing a tiered storage hierarchy and including an opportunistic data allocation mechanism in a network storage environment according to one embodiment.

FIG. 3 illustrates an exemplary file system implementing a tiered storage hierarchy and including an opportunistic data allocation mechanism in a network storage environment according to one embodiment. Host system 250 may be any of various types of devices, including, but not limited to, a personal computer system, desktop computer, laptop or notebook computer, mainframe computer system, workstation, network computer, or other suitable device. Host system 250 may include at least one processor 252. The processor 252 may be coupled to a memory 254. Memory 254 is representative of various types of possible memory media, also referred to as "computer readable media." Hard disk storage, floppy disk storage, removable disk storage, flash memory and random access memory (RAM) are examples of memory media. The terms "memory" and "memory medium" may include an installation medium, e.g., a CD-ROM or floppy disk, a computer system memory such as DRAM, SRAM, EDO RAM, SDRAM, DDR SDRAM, Rambus RAM, etc., or a non-volatile memory such as a magnetic media, e.g., a hard drive or optical storage. The memory medium may include other types of memory as well, or combinations thereof.

Host system 250 may couple, for example over a wired or wireless network or networks, to one or more other devices, e.g. client system 290, via one or more wired or wireless network interfaces. Host system 250 may couple over a network 270 to two or more storage devices (or data storage resources) on which a file system is implemented as a tiered storage hierarchy 202. Network 270 may, for example, be a Storage Area Network (SAN), a LAN with Network-Attached Storage (NAS), or any network capable of coupling storage devices to a host system 250. The storage devices used to implement the storage tiers 204 may include any of one or more types of storage devices including, but not limited to, storage systems such as RAID (Redundant Array of Independent Disks) systems, disk arrays, JBODs (Just a Bunch Of Disks, used to refer to disk cabinets that do not have a built-in RAID controller).

Host system 250 may include, in memory 254, file system software 200. File system software 200 may include, but is not limited to, an embodiment of the data storage mechanism 206 and software that provides "traditional" File System functionality 260. File System functionality 260 may be provided by any of various File System implementations including, but not limited to, disk-based file systems such as VERITAS' VxFS and UNIX File System (UFS), and networked file system such as Network File System (NFS) and AT&T's Remote File Share (RFS). In one embodiment, file system software 200 may also include a virtualization layer (not shown) that may be used to map file systems on the storage devices to a single file system and to present the single file system to one or more application(s).

File system software 200 may implement, on one or more of the storage devices, a file system as a tiered storage hierarchy 202. In one embodiment, the file system software 200 may implement the tiered storage hierarchy and manage the assignment of files within the storage tiers 204 according to user-defined policy.

The tiered storage hierarchy 202 may include one or more physical and/or logical storage devices organized in a hierarchy of two or more storage tiers 204 according to one or more characteristics of the storage devices and/or data requirements of the user(s) of the file system. For example, the storage tiers 204 may have three tiers—a first storage tier on one storage device, a second storage tier on another storage device, and a third storage tier on a third storage device. As another example, one storage device may be a first storage tier, and two other storage devices may both be included in a second storage tier. The tiered storage hierarchy 202 is made available to the application(s) 292 on client system 290 via host system 250 as one file system. The structure of the file system and the assignment and migration of data among the storage tiers within the file system are transparent to the application(s) 220.

File system software 200 may include a data allocation mechanism 206 for opportunistically storing copies of the data to different ones of the storage tiers 204 and/or to different data storage resources in the storage tiers according to a user-defined policy. If new data is created by an application 220 is to be stored to the file system 202, data allocation mechanism 206 may, according to policy, opportunistically store copies of the new data to two or more of the storage tiers 204 and/or data storage resources within the tiers, if free space is available on the tiers or data storage resources.

In one embodiment, in addition to opportunistically creating copies of new data on multiple tiers or data storage resources, data allocation mechanism 206 may opportunistically create copies of existing data in file system 202 on one or more of the tiers or data storage resources. In this embodiment, data allocation mechanism 206 may periodically or aperiodically examine the file system 202 and the data stored on the file system and, if data (e.g., files or parts of files) are detected on a tier or data storage resource that might benefit from being copied to one or more other tiers or data storage resources and if space is available on the other tier or data storage resource, may copy the data to the one or more other tiers or data storage resources.

If one of the application(s) 220 attempts to access data stored in the file system 202, file system functionality 260 of file system software 200 may, if a tier or data storage resource that includes a primary copy of the data being accessed is busy, for example above a predetermined activity threshold, opportunistically redirect the access of the data to a copy of the data stored on another tier or data storage resource by the data allocation mechanism 206, if that tier or data storage resource is not as busy as the tier or data storage resource that includes the primary copy of the data to be accessed.

Note that the configuration illustrated in FIG. 3 is an exemplary implementation of a tiered storage hierarchy and file system software including an opportunistic data allocation mechanism in an exemplary network storage environment and is not intended to be limiting. Embodiments of the opportunistic data allocation mechanism as described herein may be implemented in other configurations of systems and storage environments. For example, host system 250 and the storage devices in the tiered storage hierarchy may be directly connected rather than connected via a network. Also, note that application(s) that access the tiered storage hierarchy may be implemented on the system that includes the file system software and the immutable data mechanism.

Figure 4:
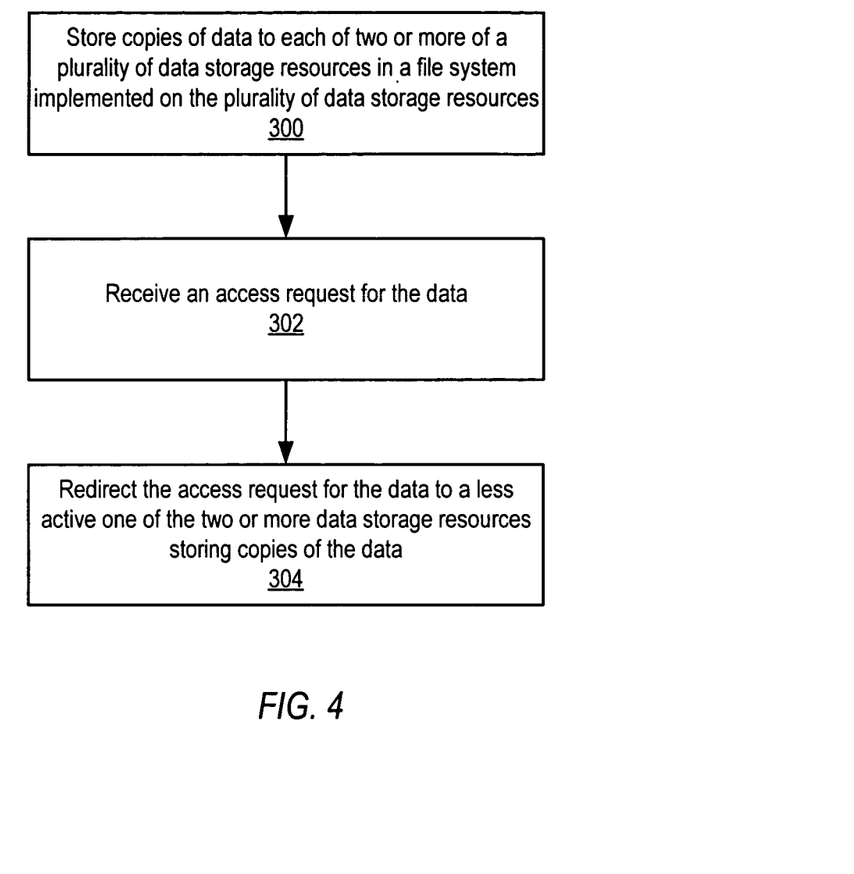
FIG. 4 is a flowchart illustrating a method of operation for an opportunistic data allocation and access mechanism in a file system according to one embodiment.

FIG. 4 is a flowchart illustrating a method of operation for an opportunistic data allocation and access mechanism in a file system according to one embodiment. In one embodiment, a file system may be implemented as a tiered storage hierarchy that may include one or more storage tiers. Each storage tier may include one or more data storage resources. A host system may couple to the file system, for example via a network. The host system may include file system software that provides file system functionality for managing storage of files on the storage tiers in the file system.

As indicated at 300 of FIG. 4, a data allocation mechanism may opportunistically allocate copies of data (e.g., a file or a portion of a file) to each of two or more of a plurality of data storage resources in a file system implemented on the plurality of data storage resources. In one embodiment, the file system may be implemented as a tiered storage hierarchy comprising a plurality of storage tiers, and each storage tier may include one or more of the plurality of data storage resources.

In one embodiment, the data allocation mechanism may allocate the copies of the data to the two or more data storage resources according to a policy. The policy may, for example, specify particular ones of the data storage resources that may be used for opportunistically storing copies of data and/or may exclude particular ones of the data storage resources from being used to opportunistically store copies of data.

Metadata for the data may be modified to indicate the location of the copies of the data within the file system. For example, instead of including a single device/offset indicator for the data, the metadata may be modified to include a list of devices and offsets, with the devices representing the different data storage resources that copies of the data are stored on and the offset representing the location on the associated device. Note that the copies of the data stored to each of the data storage resources remain online within the file system.

One of the copies may be considered a "primary" copy of the data. For example, in a tiered storage hierarchy where the higher tiers include data storage resources that generally provide better overall performance than data storage resources in lower tiers, a primary copy of the data may be stored on a data storage resource in a higher tier of the hierarchy. Other copies of the data may be opportunistically stored on data storage devices in lower tiers.

As indicated at 302, the file system software may receive an access request for the data from an application or process that uses the file system. This access request may be a standard access request, and may indicate or be directed at the primary copy of the data in the file system.

As indicated at 304, the file system software may opportunistically redirect the access request for the data to a copy of the data on a less active one of the data storage resources storing copies of the data. The file system software may examine the metadata for the requested data to determine if there are alternative copies of the data on other data storage devices, and if there are, may then determine if one or more of the alternative data storage devices are less busy than the target data storage device (i.e., the data storage device on which the primary copy of the data resides).

The above method of opportunistically storing copies of data to data storage resources in a file system and opportunistically redirecting access requests for the data to a less active data storage resource is transparent to processes, applications and users that access the file system via the file system software. The application or process that issues the data access request at 302 does not need to be aware that there may be multiple copies of the data it is requesting access to stored in the file system, nor does it need to be aware that the access request is redirected to a copy of the data rather than the primary data.

If the file system software needs storage space on one of the data storage resources in the file system, and if storage space on that data storage resource is being used to opportunistically store copies of data, the file system software may delete or overwrite one or more of the opportunistically stored copies of data from that data storage resource. The file system software knows, from the metadata, that there is a primary copy of the data on another data storage resource. The metadata for the data is updated to reflect that the copy or copies of data have been deleted or overwritten. Also note that, if a process deletes data (e.g., a file), the primary copy and all opportunistically stored copies of the data in the file system may be deleted or marked for deletion.

The file system software may include a mechanism or mechanisms to synchronize the primary data and the one or more copies of the data stored on other data storage resources in the file system. In one embodiment, a process may modify only a primary copy of data stored on a data storage resource via the file system software. In this embodiment, for example, reads to the data may be redirected to any copy of the data, but writes are not redirected and thus are initially applied only to the primary data. In one embodiment, the file system software may detect this modification of the primary data, determine from the file system metadata that there are one or more copies of the modified data and the location(s) in the file system of the copies, and mark the one or more copies of data stored on other data storage resources to indicate that they are not synchronized with the primary data and thus need to be updated from the primary data. The file system software may then periodically or aperiodically update the copies of the data that have been invalidated. Note that, if a copy of data has been marked as not synchronized, the file system software may not redirect access requests to the copy of data unless and until the copy has been synchronized with the primary data.

In another embodiment, if a primary copy of data is modified, the file system software may use the metadata for the data to locate and synchronize the one or more copies of the data immediately upon detecting the modification rather than marking the copies of the data for later synchronization.

In yet another embodiment, rather than synchronizing existing copies of modified primary data, if a primary copy of data is modified, the file system software may delete, mark for deletion or mark for re-use all copies of the data opportunistically stored on other data storage resources by the data allocation mechanism. The data allocation mechanism may then regenerate copies of the primary data on one or more data storage resources as needed and if possible (i.e., if there is storage space available).

Note that, in one embodiment, any copy of data on any data storage resource may be modified. In this embodiment, both reads and writes may be redirected from the primary data to a copy of the data stored on another data storage resource. In this embodiment, the other copies of the data, including the primary copy, may then be synchronized with the modified copy of the data using a synchronizing mechanism or mechanisms as described above.

One skilled in the art will recognize that there may be other mechanisms for synchronizing copies of data stored in a file system than those described above.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or CD-ROM, volatile or non-volatile media such as RAM (e.g. SDRAM, DDR, RDRAM, SRAM, etc.), ROM, etc. As well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A system, comprising:
at least one processor; and
a memory storing file system software that when executed by the at least one processor performs:
managing access of a file system implemented on a plurality of storage resources;
storing data to a storage resource of the plurality of storage resources, wherein the storage resource is in one class of storage resource of a plurality of classes of storage resources;
determining whether to make a copy of the data available based at least in part on determining whether storage space is available in another class of storage resource having a lower performance characteristic than the one class of storage resource;
in response to determining to make the copy of the data available, opportunistically allocating the copy of the data to another storage resource of a plurality of storage resources in the other class of storage resource, wherein opportunistically allocating comprises storing the copy of the data on the other storage resource such that the data and the copy of the data are both online in the file system and available for retrieval;
redirecting an access request for the data to a less active one of the storage resources storing the data and the copy of the data, even if said redirecting results in the access request being redirected to the other storage resource; and
in response to determining that storage space is needed in the other class of storage resource or in response to determining that the data stored in the storage resource is modified, deleting, overwriting or marking for reuse the copy of the data from the other storage resource, wherein the data remains online in the file system for retrieval from the storage resource.

2. The system as recited in claim 1, wherein each class of the plurality of classes of storage resources is distinguished from every other class of the plurality of classes of storage resources based on performance characteristics.

3. The system as recited in claim 1, wherein the data is a file or a portion of a file.

4. The system as recited in claim 1, wherein, to store the data to the storage resource and the copy of the data to the other storage resource, the file system software further performs the storage to each of the respective storage resources according to a policy, wherein the policy specifies particular ones of the plurality of storage resources available for the storage.

5. The system as recited in claim 1, wherein the file system software further performs modifying metadata for the data to indicate a location of each of the copies of the data stored in the file system.

6. The system as recited in claim 1, wherein said storage of the data to the storage resource and the copy of the data to the other storage resource and said redirection of the access request for the data to the less active one of the storage resources storing the data and the copy of the data is transparent to an application configured to access the file system.

7. A system, comprising:
a plurality of storage devices storing a file system implemented as a tiered storage hierarchy comprising a plurality of storage tiers; and
a host system configured to couple to the file system, wherein the host system comprises a computer-accessible storage medium storing file system software comprising:
a data allocation component that, when executed on the host system, is configured to:
store data to a storage tier of the plurality of storage tiers, wherein the storage tier is one class of storage tier of a plurality of classes of storage tiers;
determine whether to make a copy of the data available based at least in part on a determination whether storage space is available in another class of storage tier having a lower performance characteristic than the one class of storage tier; and
in response to a determination to make the copy of the data available, opportunistically allocate the copy of the data to another storage tier of a plurality of storage tiers in the other class of storage tiers such that the data and the copy of the data are both online in the file system and available for retrieval, wherein the opportunistic allocation comprises storage of the copy of the data on the other storage tier; and
a file system functionality component that, when executed on the host system, is configured to:
redirect an access request for the data to a less active one of the storage tiers storing the data and the copy of the data even if said redirection results in the access request being redirected to the other storage tier; and
in response to a determination that storage space is needed in the other storage tier or in response to a determination that the data stored in the storage tier is modified, delete, overwrite or mark for reuse the copy of the data from the other storage tier, wherein the data remains online in the file system for retrieval from the storage tier.

8. The system as recited in claim 7, wherein the file system software, when executed on the host system, is further configured to modify metadata for the data to indicate a location of each of the copies of the data stored in the file system.

9. A method comprising:
storing, by file system software on one or more devices, data to a storage resource of a plurality of storage resources in a file system implemented on the plurality of storage resources, wherein the data stored remains online within the file system, and wherein the storage resource is in one class of storage resource of a plurality of classes of storage resources;
determining whether to make a copy of the data available based at least in part on determining whether storage space is available in another class of storage resource having a lower performance characteristics than the one class of storage resource;
in response to determining to make the copy of the data available, opportunistically allocating the copy of the data to another storage resource of a plurality of storage resources in the other class of storage resource, wherein opportunistically allocating comprises storing, by the file system software, the copy of the data on the other storage resource such that the data and the copy of the data are both online in the file system and available for retrieval;
receiving, by the file system software, one or more access requests for the data;
redirecting, by the file system software, the access requests for the data to a less active one of the storage resource and the other storage resource even if said redirecting results in the access requests being redirected to the data storage resource; and
in response to determining that storage space is needed in the other class of storage resource or in response to determining that the data stored in the storage resource is modified, deleting, overwriting or marking for reuse the copy of the data from the other class of storage resource, wherein the data remains online in the file system for retrieval from the storage resource.

10. The method as recited in claim 9, wherein each class of the plurality of classes of storage resources is distinguished from every other class of the plurality of classes of storage resources based on performance characteristics.

11. The method as recited in claim 9, wherein said storing the data to the storage resource and the copy of the data to the other storage resource comprise storing to the respective storage resources according to a policy, wherein the policy specifies particular ones of the plurality of storage resources available for storing the data and the copies of the data.

12. The method as recited in claim 9, further comprising modifying, by the file system software, metadata for the data to indicate a location of each of the copies of the data stored in the file system.

13. The method as recited in claim 9, wherein said storing the data to the storage resource and the copy of the data to the other storage resource and said redirecting the access requests for the data to the less active one of the storage resource and the other storage resource is transparent to an application configured to access the file system.

14. A non-transitory computer-accessible storage medium storing file system software that, when executed on one or more devices, performs:

storing data to a storage resource of a plurality of storage resources in a file system implemented on the plurality of storage resources, wherein the data stored remains online within the file system, and wherein the storage resource is in one class of storage resource of a plurality of classes of storage resources;
determining whether to make a copy of the data available based at least in part on determining whether storage space is available in another class of storage resource having a lower performance characteristics than the one class of storage resource;
in response to determining to make the copy of the data available, opportunistically allocating the copy of the data to another storage resource of a plurality of storage resources in the other class of storage resource, wherein opportunistically allocating comprises storing, by the file system software, the copy of the data on the other storage resource such that the data and the copy of the data are both online in the file system and available for retrieval;
receiving one or more access requests for the data;
redirecting the one or more access requests for the data to a less active one of the storage resource storing the data and the other storage resource storing the copy of the data even if said redirecting results in the access requests being redirected to the other storage resource; and
in response to determining that storage space is needed in the other class of storage resource or in response to determining that the data stored in the storage resource is modified, deleting, overwriting or marking for reuse the copy of the data from the other class of storage resource, wherein the data remains online in the file system for retrieval from the storage resource.

15. The non-transitory computer-accessible storage medium as recited in claim 14, wherein the file system is implemented as a tiered storage hierarchy comprising a plurality of storage tiers, wherein each storage tier comprises one or more of the plurality of storage resources.

16. The non-transitory computer-accessible storage medium as recited in claim 14, wherein each class of the plurality of classes of storage resources is distinguished from every other class of the plurality of classes of storage resources based on performance characteristics.

17. The non-transitory computer-accessible storage medium as recited in claim 14, wherein the file system software further performs modifying metadata for the data to indicate a location of each of the copies of the data stored in the file system.

18. The non-transitory computer-accessible storage medium as recited in claim 14, wherein said storage of the data to the storage resource and the copy of the data to the other storage resource and said redirection of the access requests for the data to the less active one of the storage resource and the other storage resource is transparent to an application configured to access the file system.

19. The non-transitory computer-accessible storage medium as recited in claim 14, wherein said storing the data to the storage resource and the copy of the data to the other storage resource comprise storing to the respective storage resources according to a policy, wherein the policy specifies particular ones of the plurality of storage resources available for storing the data and the copies of the data.

* * * * *